Aug. 11, 1925. 1,549,579
L. LENOUVEL
OPTICAL SIGHTING DEVICE
Filed Jan. 11, 1922 2 Sheets-Sheet 1
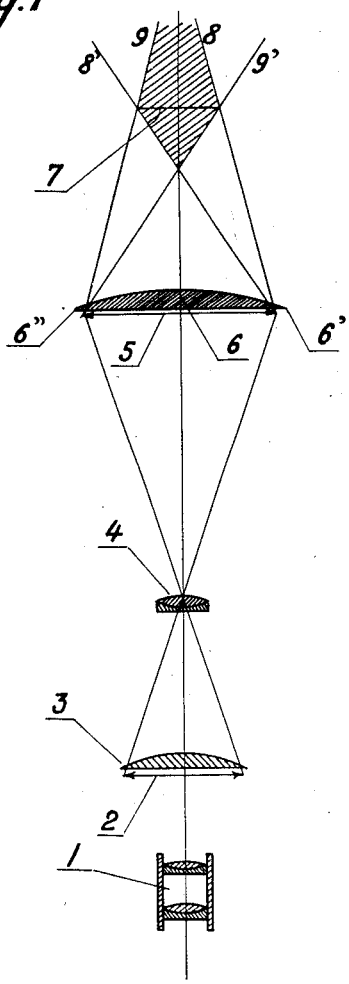
Fig. 1
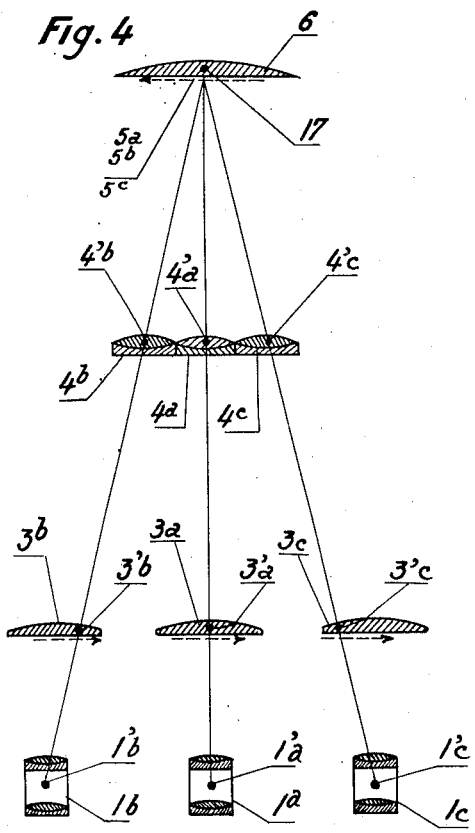
Fig. 4
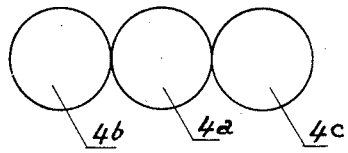
Fig. 5
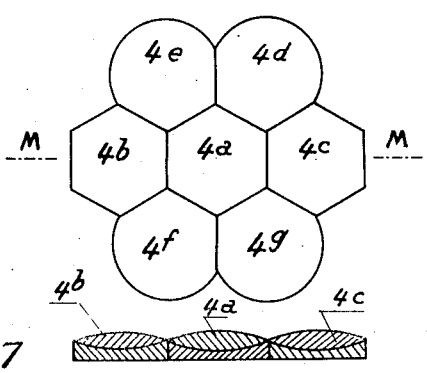
Fig. 6
Fig. 7
Inventor
L. Lenouvel,
By Marks & Clerk
Attys.

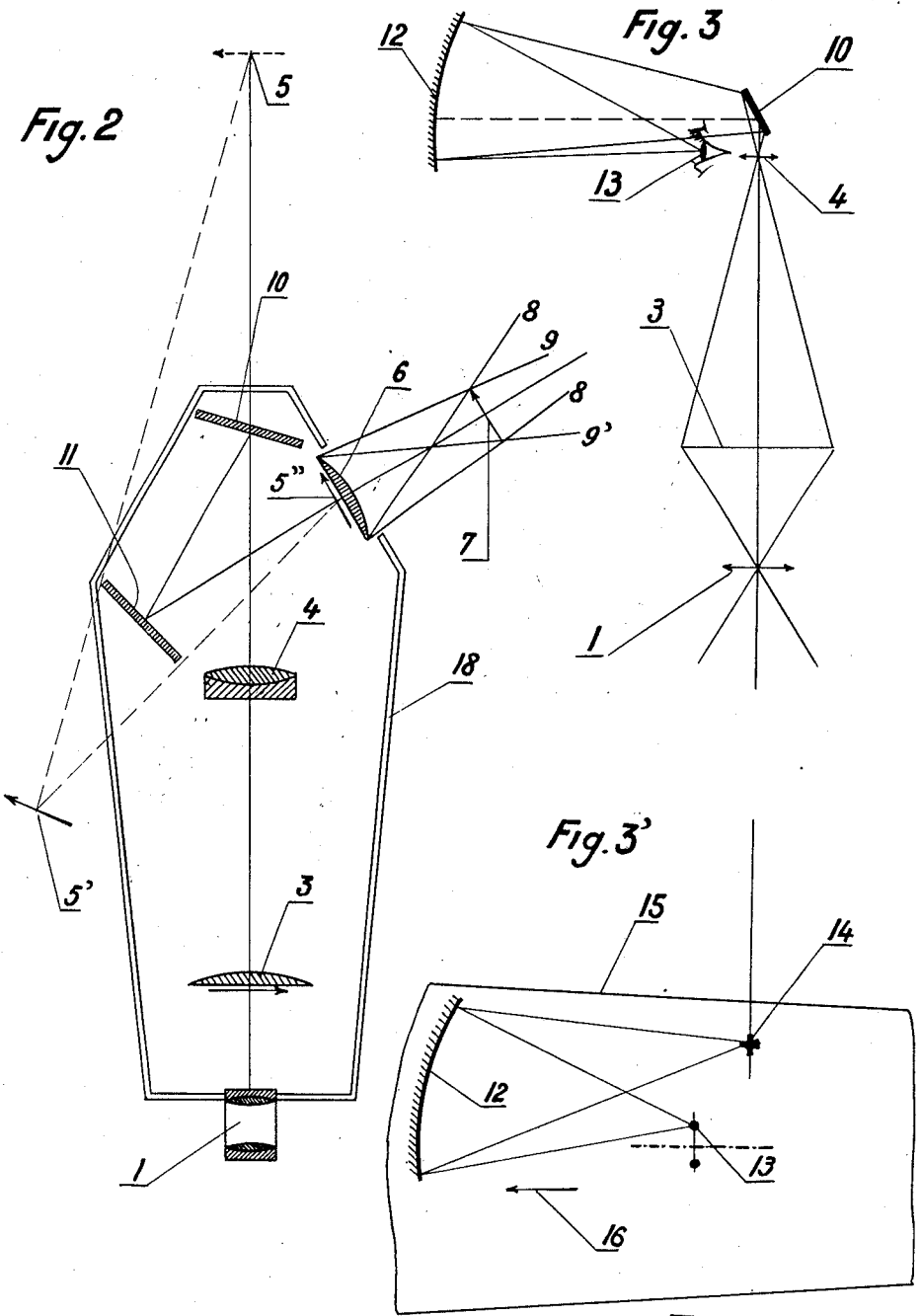

Patented Aug. 11, 1925.

1,549,579

UNITED STATES PATENT OFFICE.

LEON LENOUVEL, OF ROUEN, FRANCE, ASSIGNOR TO COMPAGNIE AÉRIENNE FRANÇAISE, OF SURESNES, SEINE, FRANCE, A CORPORATION OF FRANCE.

OPTICAL SIGHTING DEVICE.

Application filed January 11, 1922. Serial No. 528,522.

*To all whom it may concern:*

Be it known that I, LEON LENOUVEL, a citizen of the French Republic, residing at Rouen, France, have invented certain new and useful Improvements in Optical Sighting Devices, of which the following is a specification.

As a general rule the known sighting devices comprise a fixed eyehole of small size disposed very near the eyepiece and against which the observer's eye must be placed in order to perceive the entire field of the sighting device. This obligation constitutes a difficulty for the observer, especially where the apparatus is used by a pilot on board an aeroplane who is occupied with observations of the ground with a sighting device, but who has not all the desired freedom of movement, and is obliged to carry out his operations in a rapid manner and without ceasing to look after the other apparatus on board.

The present invention relates to an optical sighting device wherein such drawbacks are obviated, and it comprises to this effect an ocular ring of large size and situated at a considerable distance from the end lens of the device. The said sighting device is constituted by two optical combinations disposed in sequence, whereof each is formed of an objective and a field lens; the last combination may also comprise mirrors, and the end field lens may be replaced by a concave mirror; the real image constituted by each objective if formed upon the field lens following the same. A sighting device of this type will afford a straight image. The ocular ring which constitutes the image, in the ocular field lens, of the objective situated in front of the same, has a considerable size, and it gives rise with this field lens to a veritable ocular cone wherein the eye may be displaced while continuing to perceive all points of the field.

The range of position or the field of the eye may be still further increased by constituting a composite sighting device wherein a plurality of elementary sighting devices of the above mentioned type are so combined that the lenses shall have the axes thereof in parallel disposition, but that the geometrical axes of these elementary sighting devices, or lines passing through the optical centres of the different lenses of each device, shall be concurrent and that all the said elementary sighting devices shall cooperate with a given ocular field lens.

The following description, together with the accompanying drawing, sets forth various forms of construction of a simple and a composite sighting device according to the invention, wherein:

Fig. 1 is a diagrammatic view of a simple rectilinear sighting device, and Figs. 2, 3 and 3' are like views of simple sighting devices of the reflection type. Fig. 4 is a diagrammatic view of a sighting device of the composite type. Figs. 5 and 6 represent two arrangements of the elementary lenses of the second objective of the said sighting device. Fig. 7 is a section of Fig. 6 on the plane M—M.

The sighting piece shown in Fig. 1 comprises an achromatic objective 1 forming a real and inverted image 2 upon the first field lens 3. A second lens 4 forms at 5 a real and rectified image of 2 upon a second field lens 6. The first field lens 3 is so disposed as to form, on the rear side of the objective 1, an image which covers the front face of the objective 4. The second field lens 6 is so disposed as to provide, of the rear side of the objective 4, a real image 7 of sufficiently large size and situated at a certain distance from the lens 6, which size and distance will be determined in each particular case according to the requirements for the convenience of observation. The rays from the end points of the field of the sighting piece which after the second objective 4 form their images at 6' and 6" are bounded after the lens 6 by the cones 8—8' and 9—9' whereof the apex is respectively at 6', 6" and the base the ocular ring 7. The hatched part common to these cones is common to all the rays from the intermediate points of the field, this being the cone 8—9 passing outwardly of the end lens 6 and through the circle 7. By placing the eye at any point in this region which has a considerable depth and section, the observer will perceive all points of the field.

If the sighting piece is to be provided with a reticule, the latter may be disposed either at 2 or at 5, in the plane of one of the two real images which are formed in the apparatus. Should it be necessary to perceive the image of an apparatus such for instance as a level, compass or the like at the same time as the image observed in the sighting device, the image of this apparatus will be projected at 2 or 5.

The sighting devices of simple character which are shown in Figs. 2 and 3 are constructed particularly for the observation of the ground from an aeroplane. The arrangement shown in Fig. 2 comprises the same optical elements as the sighting device shown in Fig. 1. In order to shorten the apparatus and to send the image in the proper direction, or in the direction of the eye of the pilot when the latter places his head in the normal position, the device has disposed after the objective 4 two mirrors 10 and 11 in such manner that the image 5 which would have been produced by the objective 4 is successively disposed at 5' and 5'' upon the lens 6. The sighting device is contained in the casing 18.

The cone 8—9 which determines the field wherein the observer's eye may be placed is directed towards the position normally occupied by the pilot's head when in the position of flight and in such manner that the ocular ring 7 shall be adjacent the observer's head. The pilot is thus enabled without moving his head to perceive the whole extent of the ground comprised in the field of the sighting device below the aeroplane without entirely abandoning the surveillance of the other apparatus on board. By giving a suitable position to the mirrors the operator can cause the second real image 5'' to be formed on the second mirror 11; in this case the end field lens 6 will be applied against the said mirror. The combination of the mirror 11 and the lens 6 may be replaced by the lens 6 alone whereof the plane face is silvered, or a lens of this kind with silvered plane face may as is well known be replaced by a concave mirror. This combination is shown in a diagrammatic manner in Figs. 3 and 3' comprising an elevation and a plan view. The first objective 1, the first field lens 3, and the second objective 4 are the same as indicated in Figs. 1 and 2. A mirror 10' inclined with reference to the optical axis is disposed after the objective 4 and sends the beam upon a spherical mirror 12—or a field lens having a silver plane face—which sends the same to an ocular ring situated adjacent the pilot's eye 13. In the plan view Fig. 3', the cross 14 represents the optical axis of the lenses 1, 3, 4; the main body of the aeroplane is shown at 15; the direction of travel of the aeroplane is indicated by the arrow 16. It is observed that with this arrangement the sighting device can be placed at 14 at the side of the operator when the apparatus board having the mirror 12 secured thereto has not sufficient space to receive the body of the sighting device itself.

A sighting device can be constructed wherein the section of the field for the eye may be still further increased by juxtaposing a plurality of elementary sighting devices similar to the one above described, in such manner that all the devices shall have the common end field lens 6.

Fig. 4 represents a group of three elementary sighting devices, having in common the end field lens 6. The three geometrical axes (A) (B) (C) pass through the optical centre 17 of the said lens. These geometrical axes are straight lines whereupon are respectively situated the optical centres $4'^a$, $4'^b$, $4'^c$ of the secondary objectives $4^a$, $4^b$, $4^c$, the centres $3'^a$, $3'^b$, $3'^c$ of the primary field lenses $3^a$, $3^b$, $3^c$ and the centres $a$, $b$, $c$, of the primary objectives $1^a$, $1^b$, $1^c$. The primary objectives $1^a$, $1^b$, $1^c$, have their optical axes parallel to each other, and are disposed in a common transverse plane. The same is true for the lenses $3^a$, $3^b$, $3^c$, and the objectives $4^a$, $4^b$, $4^c$.

The secondary images $5^a$, $5^b$, $5^c$ formed by the various combinations are superposed on the end field lens 6, which is common to the three sighting devices. If desired, only the operative region of the lateral lenses $3^b$, $3^c$, may be preserved. As to the secondary objectives $4^a$, $4^b$, $4^c$, these should be at least in the tangent position—as shown in plan in Fig. 5—to obviate any discontinuity in the field perceived by the eye which would result in a defective sighting. It is also preferable, as shown in plan in Fig. 6 and in section on the line M—M, Fig. 7, to constitute the profile of the lenses according to a regular hexagon either completely ($4^a$, $4^b$, $4^c$) or partially ($4^d$ . . . $4^g$), thereby affording a honey comb assemblage which will obviate all discontinuity in the light beam. According to the sense wherein it is desired to increase the field visible to the eye, the different elementary sighting devices will be disposed according to radial planes or concentric circumferences, in such number as will be determined by the individual characteristics of each lens.

The field perceived by the eye will be increased in the said composite sighting device as compared with the simple form of sighting device, from the fact that the ocular ring is the image, formed through the end field lens 6, of the last objective $4^a$, $4^b$, $4^c$; inasmuch as this is composite it will have a much greater surface than the single objective 4 of the simple form of sighting device. The optical field of the sighting device itself is substantially the same as that of a simple sighting device, since the optical axes of the first objectives $1^a$, $1^b$, $1^c$ are in parallel disposition.

What I claim is:

1. A sighting device comprising in sequence from rear to front an objective, a field lens in the focal plane of said objective, a second objective upon which is formed an image of the rear part of the first objective through the first field lens, and an optical device upon which is formed an image of the field lens through the second objective and forming an enlarged image of the rear part of the second objective at a certain distance.

2. A sight device comprising in sequence from rear to front an objective, a field lens in the focal plane of said objective, a second objective upon which is formed an image of the rear part of the first objective through the first field lens, a plane mirror, and an optical device upon which is formed an image of the field lens through the second objective and forming an enlarged image of rear part of second objective at a certain distance.

3. A sighting device comprising in sequence from rear to front an objective, a field lens in the focal plane of said objective, a second objective upon which is formed an image of the rear part of the first objective through the first field lens, a plane mirror, and a concave mirror upon which is formed an image of the field lens through the second objective and forming an enlarged image of the rear part of the second objective at a certain distance.

In witness whereof I have hereunto set my hand.

LEON LENOUVEL.